United States Patent [19]

Bernauer et al.

[11] 4,441,326

[45] Apr. 10, 1984

[54] PROCESS FOR COOLING THE PASSENGER COMPARTMENTS OF VEHICLES WITH HYDROGEN-CONSUMING ENGINES BY MECHANICAL REFRIGERATING PROCEDURE

[75] Inventors: Otto Bernauer, Weinstadt; Hans-Peter Holzt, Esslingen; Hermann Lenz, Stuttgart, all of Fed. Rep. of Germany

[73] Assignee: Daimler-Benz Aktiengesellschaft, Stuttgart, Fed. Rep. of Germany

[21] Appl. No.: 329,049

[22] Filed: Dec. 9, 1981

[30] Foreign Application Priority Data

Dec. 13, 1980 [DE] Fed. Rep. of Germany ....... 3047023

[51] Int. Cl.³ .......................................... F25B 19/00
[52] U.S. Cl. ........................................ 62/7; 62/239; 62/243
[58] Field of Search ................... 62/7, 239, 238.6, 243

[56] References Cited

U.S. PATENT DOCUMENTS

| 2,213,733 | 9/1940 | Hicke | 62/239 |
| 2,418,446 | 4/1947 | Anderson | 62/238.6 X |
| 3,077,745 | 2/1963 | Grantham et al. | 62/239 X |
| 4,179,896 | 12/1979 | Buchner et al. | 62/7 |
| 4,315,597 | 2/1982 | Garraffa, Jr. | 62/238.6 X |

Primary Examiner—Lloyd L. King
Attorney, Agent, or Firm—Craig & Burns

[57] ABSTRACT

A process for cooling a passenger compartment of a vehicle equipped with a hydrogen-consuming engine by mechanical refrigeration involves compressing a gaseous coolant, condensing the resulting compressed and heated gaseous coolant with heat removal to liquefy the coolant, and evaporating the liquefied coolant under the action of a pressure relief valve so that the cold generated during the pressure relief is used to cool the passenger compartment. This process is improved by removing additional heat from the compressed coolant by passing the coolant through a metal hydride cooler.

6 Claims, 1 Drawing Figure

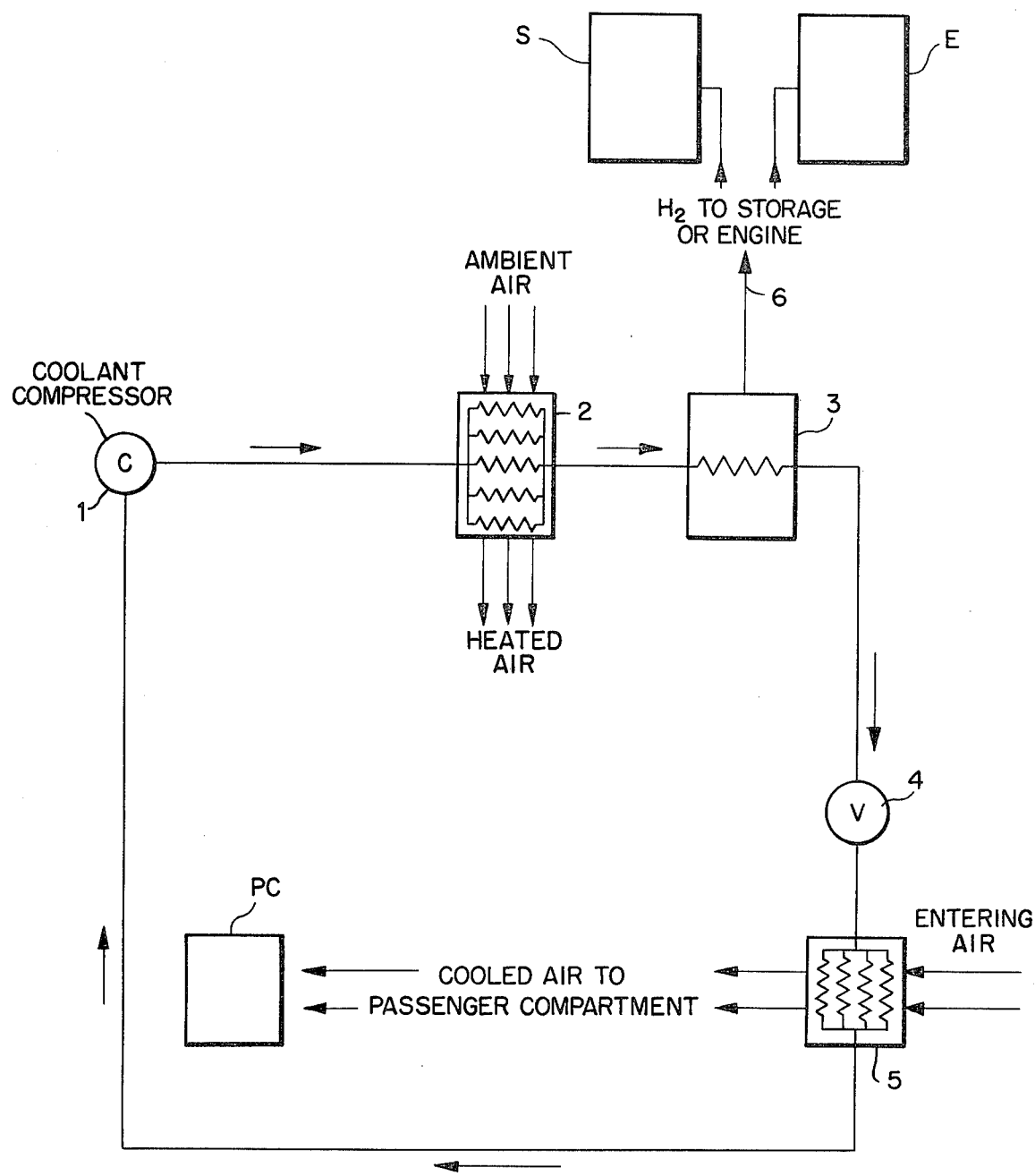

PROCESS FOR COOLING THE PASSENGER COMPARTMENTS OF VEHICLES WITH HYDROGEN-CONSUMING ENGINES BY MECHANICAL REFRIGERATING PROCEDURE

This invention relates to the process for cooling a passenger compartment of a vehicle equipped with a hydrogen-powered engine by mechanical refrigeration using a metal hydride. Cooling systems for climate control in automobiles are very common. In such cooling systems which operate on the mechanical refrigerating principle, a gaseous coolant is compressed, during which process the coolant is heated; subsequently, the gas is liquefied in a condenser with heat removal and is evaporated behind a throttle valve in an evaporator; the evaporator here is designed as a heat exchanger and is used to cool the outside air flowing into the car.

The coolants for these cooling systems are usually chlorinated fluorocarbons or chlorinated fluorohydrocarbons. After compression in the compressor, the coolant enters the condenser at a temperature of approximately 130° C. Heat abstraction or removal in the condenser is accomplished by cooling of the condenser by the movement of the air created by the vehicle's motion or by the stream of air generated by a radiator fan. The condensed coolant leaves the condenser at a temperature of approximately 60° C.; it is hardly possible to achieve a lower temperature because otherwise the heat exchanger of the condenser would be very large in terms of the volume. The now-liquid coolant is expanded in an expansion valve and reaches the evaporator at a temperature of approximately 0° C. Here it evaporates and, in relinquising its cold state, it serves to cool the air stream fed into the passenger compartment. The coolant, which is now in gaseous form again, enters the compressor at a temperature of approximately 15° C.; this completes the circuit. Since the coolant leaves the condenser at a temperature of approximately 60° C., but the evaporator operates at a temperature of approximately 0° C., expansion occurs far in the wet steam range so that only a portion of the evaporation enthalpy of the mass flow of coolant can be utilized at temperatures of approximately 0° C.

The task of the invention, therefore, consists of improving the cooling of the coolant after compression in order to increase the efficiency of the cooling system.

This task is accomplished by a process wherein additional heat is removed from the condensed coolant by use of a metal hydride cooler or cooling unit.

In the case of energy converters which are operated either completely or in part by hydrogen, either as internal combustion engines or as fuel cells with an associated electric motor, the hydrogen can, as is well known, be stored as a metal hydride in hydride storage units. Energy must be expended to release the hydrogen from the metal hydride. The invention is based on extracting from the hot, compressed coolant the energy required for splitting the metal hydride and at the same time cooling the coolant. Initially, a portion of the heat of the hot coolant is extracted by air cooling in a known fashion with a condenser, and then by splitting or decomposing the metal hydride another quantity of heat is removed from the still-warm condensate by subcooling. For this purpose, the coolant must be brought into contact with the metal hydride under conditions of heat conduction. It is a good practice for the hydride storage unit to be designed as a heat exchanger.

The selection of the metal hydride to be employed is determined by the metal temperature levels in front of and behind the metal hydride storage unit. It is possible to use metal hydrides above which a hydrogen pressure of 1 atmosphere is established at temperatures of $-10°$ C. to 60° C. In order to ensure effective heat exchange at the necessary speed, preference is given to hydrides which can be completely discharged of hydrogen at temperatures of 0° C. to 30° C., especially up to 10° C., i.e., above which a hydrogen pressure of at least 1 bar is established at these temperatures. Post-cooling of the liquefied coolant should take place only to the extent that behind the expansion valve the coolant does not drop below a temperature of 0° C. since, otherwise, there is danger of icing of the evaporator. Hydrides which can be used are, for instance, the hydrides of TiFe, hydrides based on TiCrMn and hydrides based on misch metal $Ni_5$. Misch metal is defined, for instance, as an alloy which can be extracted from monazite with the approximate composition 50–60% Ce, 25–30% La, 15–17% Nd, 4–6% Pr and approximately 2% of other rare-earth elements. Hydrides based on TiFe, $TiFe_{0.8}Mn_{0.2}$ or $Ti_{0.8}Zr_{0.2}CrMn$ are specially suited.

EXAMPLE

To generate a refrigerating capacity of 10 kW, the drive power for the compressor in accordance with the previous procedure for cooling the automobile interior is approximately 6.5 kW. Here, after compression, the coolant ($CCl_2F_2$) enters the condenser at a temperature of approximately 130° C. In the condenser, a power of aproximately 16.5 kW is extracted by air cooling and the condensate enters the condenser in a quantity of 360 kg/hr and at a temperature of approximately 60° C. Subsequently, the coolant is expanded in an expansion valve (throttle valve) and, at temperatures of 0° C., enters the evaporator at which a refrigerating capacity of 10 kW is available. The coolant, which is now again in gaseous form, leaves the evaporator at a temperature of approximately 15° C. and is recompressed.

If, for example, according to one embodiment of the invention, the condensate which, after air cooling, leaves the condenser still at a temperature of approximately 60° C. is further cooled to a temperature approximately 35° C. by providing the energy for splitting a metal hydride (i.e., TiFe-hydride) in a downstream hydride cooler, the following results are achieved for a refrigerating capacity of 10 kW: the drive power of the compressor is approximately 5.5 kW; this corresponds to a savings of approximately 15% compared with the previous procedure. The coolant enters the condenser at a temperature of approximately 130° C.; in the condenser a power of approximately 13.5 kW must be extracted by air cooling, and the condensate leaves the condenser at a temperature of 60° C. and in a quantity of 280 kg/hr. Subsequently, approximately another 2 kW are removed in a hydride cooler by splitting a metal hydride. In this process, the condensate, which has a temperature of 60° C., is cooled to 35° C. After passing through the hydride cooler, the coolant is again expanded in an expansion valve and, as in the case of conventional operation, enters the evaporator and from there returns to the compressor. A refrigerating capacity of 10 kW is again available at the evaporator.

The savings which can be achieved consist not only of a reduced drive power and a compressor delivery volume which is approximately 20% lower, but also an approximately 20% lower fan power required for air cooling of the condenser as well as an overall reduction in design volume and weight which is thus made possible.

If the refrigerating capacity in the hydride store increases due to elevated $H_2$ consumption, then the drive power for the condenser blower can be reduced. In the case, for example, of a high drive power for the drive assembly (motor vehicle), this may make it possible to shut off the condenser fan.

It will be understood that the hydride cooler of this invention comprises a metal hydride storage unit which is in heat exchange relationship with a conduit through which the compressed coolant is returned to the evaporator section of the mechanical refrigeration system. Also, the hydrogen gas which is released from the metal hydride may be passed directly to the hydrogen powered engine or the hydrogen may be passed to a hydrogen storage unit for storing the hydrogen until needed by the engine.

BRIEF DESCRIPTION OF THE DRAWING

The sole FIGURE in the accompanying drawings illustrates schematically an apparatus for carrying out the process of this invention.

DESCRIPTION OF THE PREFERRED EMBODIMENT

In this FIGURE, reference numeral 1 designates a compressor, of the type previously described wherein it may be driven by the engine of an automotive vehicle, for compressing the gaseous coolant. The compressed coolant leaves compressor 1 and enters condenser 2 where the gaseous coolant is converted into a liquid by heat being removed by ambient air, i.e. air which is moved through the condenser 2 by the forward motion of the vehicle or a typical fan. Then the coolant is further cooled by additional heat being removed in the metal hydride cooler 3. As was previously discussed, the metal hydride cooler extracts more heat from the compressed coolant by using the heat to decompose a metal hydride to hydrogen and the base metal or metals. This process is called pyrolysis. While it is possible to use a metal hydride above which a hydrogen pressure of 1 atmosphere is established at temperatures of $-10°$ C. to 60° C., it is preferable to use hydrides which can be completely discharged of hydrogen at temperatures of 0° C. to 30° C. and especially up to 10° C. Hydrides based on TiFe, $TiFe_{0.8}Mn_{0.2}$ or $Ti_{0.8}Zr_{0.2}CrMn$ are especially well suited. The resulting liquefied and subcooled coolant is then passed to the pressure relief valve 4 where the coolant expands and is passed through the evaporator 5 which serves to cool the air entering into the passenger compartment PC of a vehicle (not shown). Hydrogen gas from the hydride cooler is discharged through conduit 6 to a storage unit S or to a hydrogen-consuming engine E.

What is claimed is:

1. A process for cooling a passenger compartment of a vehicle comprising equipping a vehicle with a hydrogen-consuming engine, cooling using a mechanical refrigerating procedure wherein a gaseous coolant is compressed, condensing the resulting compressed and heated gaseous coolant with heat removal to liquefy the coolant, and evaporating the liquefied coolant under the action of a pressure relief valve, using the cold generated during the pressure relief to cool the passenger compartment, and at least partially implementing the heat removal by heat taken up by decomposition of a metal hydride.

2. The process according to claim 1, further comprising the metal hydride being a hydride above which a hydrogen pressure of 1 atmosphere prevails at temperatures from $-10°$ C. to 60° C.

3. The process according to claim 1 or claim 2, further comprising the metal hydride being a hydride above which a hydrogen pressure of at least 1 atmosphere prevails at temperatures of from 0° C. to 30° C., especially 0° C. to 10° C.

4. The process according to claim 1 or claim 2, further comprising the metal hydride being contained within a hydride cooler being in heat exchange relationship with a conduct through which the compressed coolant flows to said relief valve.

5. The process according to claim 1, further comprising producing hydrogen by the decomposition of the metal hydride being utilized by the hydrogen-consuming engine.

6. The process according to claim 1 further comprising using an air conditioner in the mechanical refrigerating procedure.

* * * * *